Jan. 1, 1935.                C. W. LOGAN                1,986,350
                            ELECTRIC HEATER
                          Filed Oct. 1, 1931           3 Sheets-Sheet 3
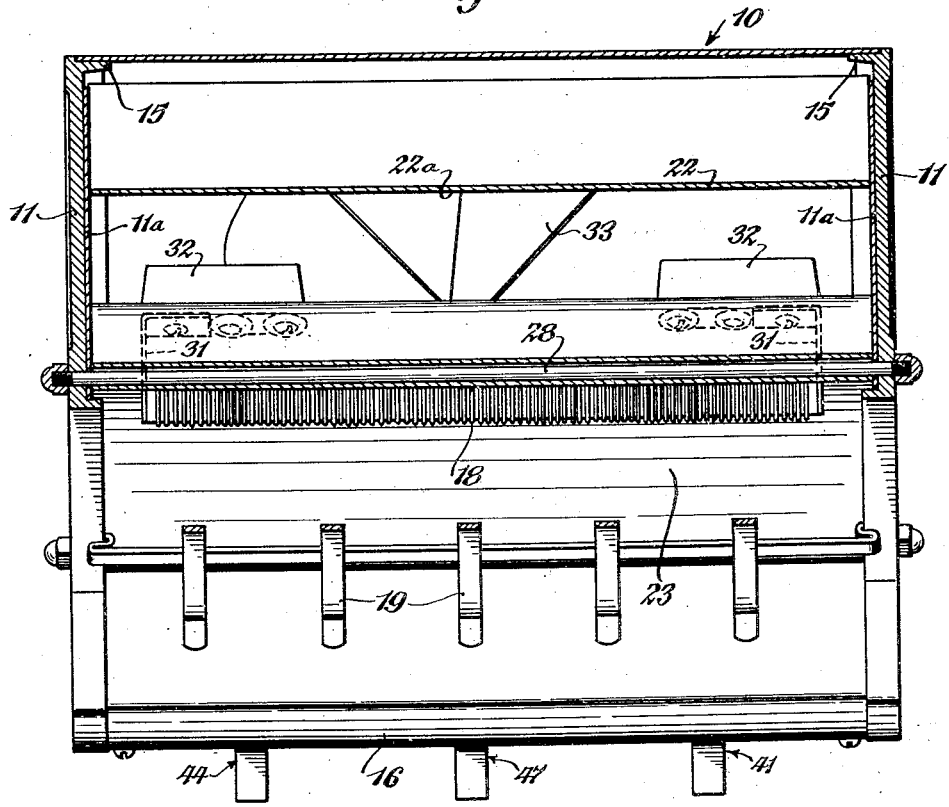
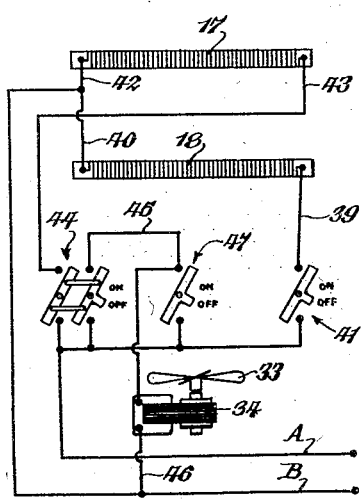
INVENTOR
Charles W. Logan
BY Popp and Powers
ATTORNEYS Patented Jan. 1, 1935

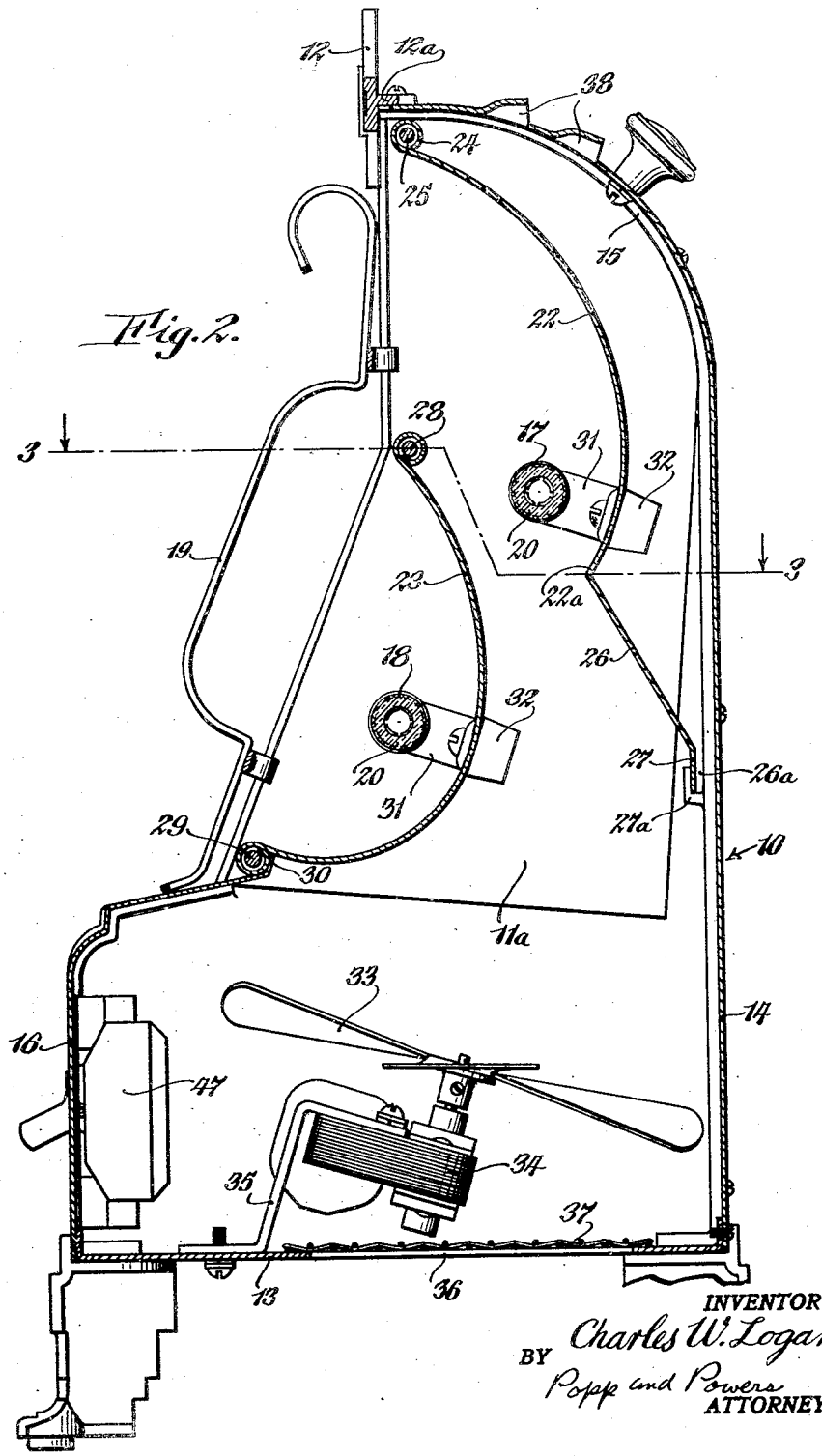

1,986,350

UNITED STATES PATENT OFFICE 1,986,350

ELECTRIC HEATER

Charles W. Logan, Kenmore, N. Y., assignor to Markel Electric Products, Inc., Buffalo, N. Y., a corporation of New York Application October 1, 1931, Serial No. 566,216

4 Claims. (Cl. 219—34)

This invention relates to improvements in radiant heaters of the kind which include means for creating a current of air, the said air current, when heated, being availed of to supplement the reflected heat and being available, when not heated, as a cooling medium.

One object of the invention is a novel construction and arrangement of the parts of a heater of the type generally described, whereby a large volume of air may be circulated through the heater to insure a high efficiency without impairing the effect created by the heating elements.

A further object is to provide a heater which is economical to manufacture and which is ornamental and attractive in appearance.

The invention is illustrated in the accompanying drawings in which:

Figure 2 is a vertical section of the heater taken along line 2—2 of Figure 1.

Figure 3 is a horizontal section of the heater taken along line 3—3 of Figure 2.

Figure 4 is a diagrammatic view illustrating one way in which the heating elements and fan may be connected to power.

Figure 1:
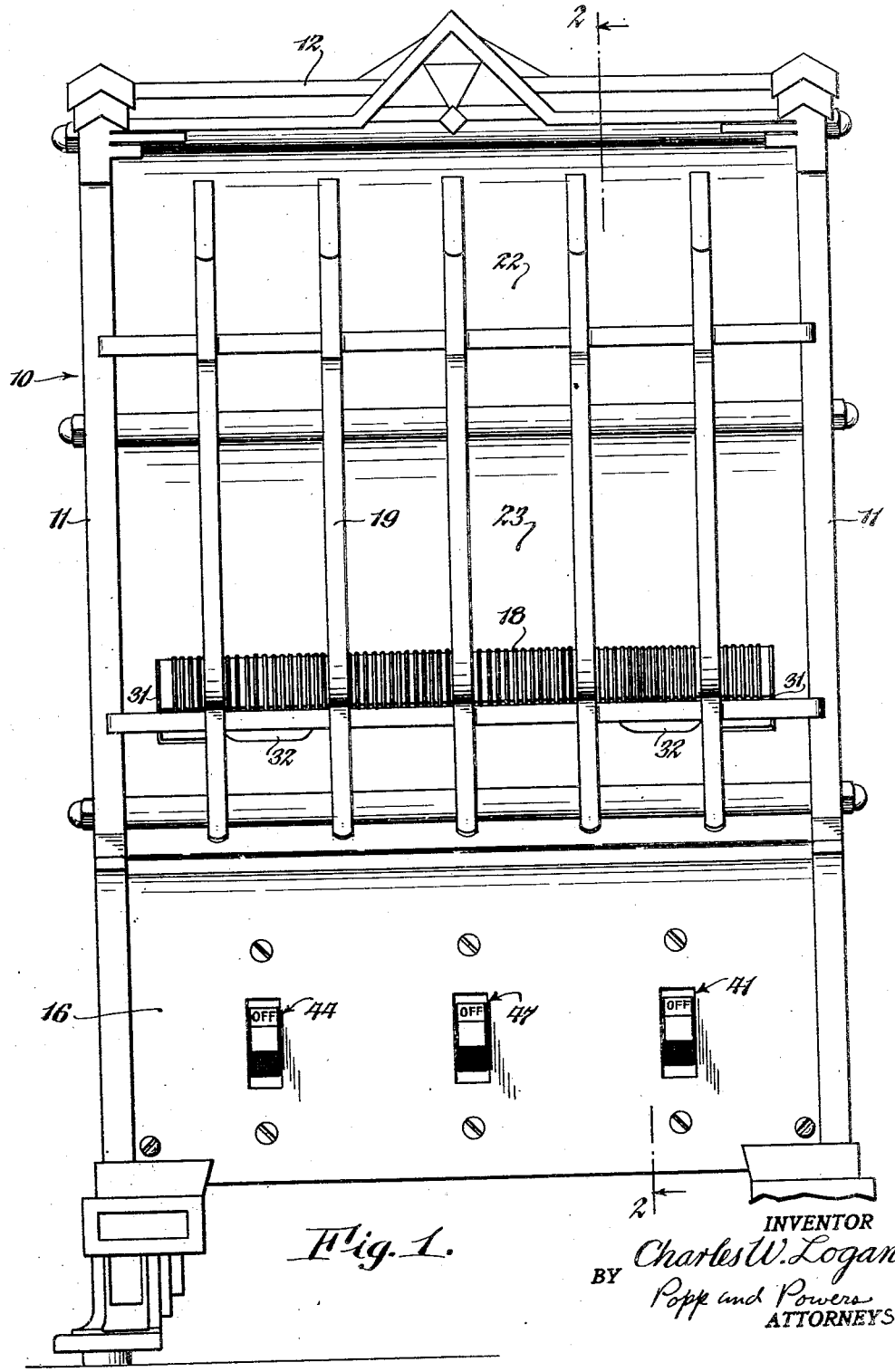
Figure 1 is a front elevation of a heater constructed in accordance with the invention.

The various parts of the heater are enclosed in a suitable casing or housing 10. As illustrated, the said casing or housing is provided by suitable side plates 11 which may be formed conveniently as castings. At their upper ends, the side plates 11 are connected by a cross member 12, it being understood that the side plates and cross member may be formed in the process of their manufacture with any desired surface ornamentation. At their lower ends, the side members 11 are connected to a plate 13 which provides a bottom for the casing 10. The rear wall 14 of the casing is connected along its lower margin to an upturned edge of the bottom plate 13 and is arched inwardly at its upper end for connection to a rib 12a formed on the cross member 12, the side members 11 being formed with inwardly projecting ribs 15 against which the rear wall 14 of the casing is secured. The front wall 16 of the casing is also connected along its lower margin to an upturned edge at the front of the bottom plate 13. The upper edge of the wall 16, the cross member 12 and the side plates 11 define the opening through which the heat generated by the heating elements 17 and 18 is directed. A suitable grill work 19 is preferably secured to the casing in front of this opening so as to guard against accidental contact with the heating elements.

It is desirable, from the standpoint of appearance, that in heaters of the radiant type the reflectors be so formed and arranged with respect to the heating elements that upon energization of an element the image produced by it in its reflector covers substantially the entire reflector. In such a heater, the glowing element merges in its image, thereby creating the impression that the entire reflector is a glowing element. This effect lends to the appearance of the heater and is desirable for this reason. With this end in view, each of the heating elements 17 and 18 includes an elongated tubular insulating core 20 upon which the resistance element is carried. The latter is preferably in the form of a wire wound spirally upon the said core. A heating element of this type, when energized, provides an elongated glowing element.

The heating elements 17 and 18 are arranged in front of their respective reflectors 22 and 23, both of which are in the form of concave sheets, the upper reflector 22 being curled at its upper edge as at 24 about a rod 25 which is carried by the side plates 11 of the casing. The reflector 22, as illustrated, is formed with a portion 26 which extends angularly in the direction of the rear wall 14, the portion 26 terminating in a short extension 27 which is substantially parallel to the rear wall. The extension 27 is spaced from the wall 14 to provide an air passage 26a and it is secured in such position by projections 27a formed or provided on the side plates 11. The lower reflector 23 is secured in the casing by transversely extending rods 28 and 29, the latter extending in front of and adjacent the upturned edge 30 of the front wall 16. The side plates 11 preferably carry reflectors 11a against which the reflectors 22 and 23 abut, it being understood that those areas of the side plates which co-operate with the reflectors may be otherwise provided with reflecting surfaces, if desired. It will be noted that the upper portion of the reflector 23 extends in front of the lower portion of the reflector 22, the reflector 22 extending a substantial distance above its companion reflector and being so spaced therefrom as to provide a passage the entire width of the casing.

The elongated heating elements are preferably a length substantially equal to the width of the heater casing and the ends of their respective reflectors, as illustrated abut the side reflectors 11a. Each of the reflectors is preferably formed and its heating element is so arranged that the image of the element covers substantially the entire area of its reflector. Thus, upon energization of the elements glowing images will be produced in the reflectors. By virtue of the arrangement of the upper portion of the reflector 23 in front of the lower portion of the reflector 22, that portion of the image produced in the reflector 22 which is observed will provide a continuation of the image produced in the reflector 23. The effect, therefore, to the eye is that there is a uniform unbroken glowing area which in width is substantially equal to the distance between the side plates 11 and which in height is substantially equal to the distance between the lower edge of the reflector 23 and the upper edge of the reflector 22 and this effect is not impaired to any appreciable extent because of the spacing of the reflectors.

The heating elements are secured to and in spaced relation from their respective reflectors by brackets 31 which engage the ends of the insulating cores 20 of the elements. Insulator blocks 32 which are adapted to carry the power line terminals are secured to the reflectors behind the heating elements. For convenience the insulator blocks, as illustrated, are availed of in securing the brackets 31 to the reflectors.

In accordance with the invention, means is provided for creating a current of air in the casing 10 which may be heated and availed of to supplement the heat reflected by the reflectors 22 and 23 or which, without being heated, may be availed of as a cooling medium. To this end, a fan 33 is carried in the lower part of the casing 10, which fan may be operated by a suitable motor 34. The latter, as illustrated, may be conveniently supported by a bracket 35 secured to the bottom plate 13 of the casing. The said bottom plate is formed with an opening 36 through which air may be drawn by the fan 33 into the casing, the opening as illustrated, being closed by a screen 37 which acts as a guard.

The fan 33 is arranged to direct the air drawn through the opening 36 toward the passage between the reflectors 22 and 23 and the air so directed is deflected by the reflector 22 out of the casing 10 in substantially the same direction as the reflected heat. In this connection, it will be noted that the lower edge 22a of the reflector 22 provides with the reflector 23 a restriction at this point in the passage between the reflectors and that the said restriction occurs in close proximity to the heating element 17. Hence, the air which passes between the two reflectors is compelled to pass close to the heating element 17 and, therefore, although a relatively large volume of air is directed through the passage, it will be heated to the desired extent by the heating element.

When the fan 33 is inoperative and the heating elements are energized the heat which is directed outwardly from the heater is reflected heat. At such a time, a substantial part of the heat from the elements 17 and 18 will be taken up by air in the vicinity of the elements, and this air, owing to convection, will move upwardly. However, during the operation of the fan 33, the air current produced by the fan and which is directed outwardly by the reflector 22 picks up these heated air currents which would otherwise be lost and carries them in substantially the same direction as the reflected heat. The reflectors absorb a considerable portion of the heat generated by the heating elements and it will be apparent, therefore, that the current of air created by the fan 33 is initially heated by the reflector 23 as it passes behind the latter. Thus, by utilizing the reflectors to direct the current of air created by the fan, the efficient operation of the heater is insured. The arrangement of the reflectors in the manner disclosed has the further advantage that a large volume of air may be heated and inasmuch as the passage of the air through the heater is unobstructed to any substantial extent, the range of the heater is greatly increased during the operation of the fan.

The angularly extending portion 26 carried by the reflector 22 serves to direct the air into the passage between the reflectors while the passage 26a formed by the extension 27 permits some air from the fan 33 to pass behind the reflector 22 thereby preventing excessive heating of the rear wall 14 of the casing. The air passing through the passage 26a leaves the heater casing through suitable vents 38 formed in the arched portion of the rear wall 14. The air current created by the fan 33, when not heated, may be availed of as a cooling medium and as the volume of air which can be passed through the heater is large, the device has a high efficiency when employed in this capacity.

The heating elements and fan may be connected to power in any manner desired. As illustrated in Figure 4, they are included in the power circuit so that the element 18 may be connected to power independently of the element 17 and the fan 33. To this end, the resistance wire of the said element is connected at one end to a wire 39 and at its opposite end to a wire 40. The latter is connected to the B side of the power line while the wire 39 is connected to the A side of the power line through a switch 41. One end of the resistance wire of the element 17 is connected by a wire 42 to the B side of the power line and the opposite end of the said element is connected to a wire 43, the latter being connected to the A side of the power line by a switch 44. The closing of the switch 44 also connects the fan motor 34 to the A side of the power line through wire 45, the said motor being permanently connected to the B side of the power line by wire 46. It will be apparent, therefore, that upon closing of the switch 44 the element 17 will be energized and the fan 33 will create a current of air which will be forced past said element, whereby a current of heated air will be directed from the heater casing at the same time and in substantially the same direction as the heat reflected by the reflector 22. The motor 34 may also be connected to the A side of the power line by a switch 47 without the energization of either of the heating elements. Upon closing of the switch 47 it will be apparent that the current of air created by the fan 33 will not be heated and, therefore, may be availed of as a cooling medium.

From the foregoing, it will be apparent that the arrangement and construction of the reflectors in the manner disclosed enables the production of a large unbroken image which adds materially to the appearance of the heater. This arrangement also permits the passage of large volumes of air through the heater without impairment of the image while at the same time increasing to a substantial extent the range of the heater.

I claim as my invention:

1. In an electric heater, the combination of an elongated heating element which is adapted to glow when energized, a reflector for reflecting heat generated by the said element, a second elongated heating element which is adapted to glow when energized, a second reflector for said second heating element, said second reflector being located behind said first named reflector to provide a passage and extending above said first named reflector so that when the heating elements are energized the images thereof merge to provide a composite image which is larger than that provided by said first mentioned heating element and means for directing air through said passage, whereby it is preheated by the reflector of said first named heating element and further heated by direct contact with said second heating element, said second reflector being curved to direct the current of heated air outwardly to supplement the heat reflected by said reflectors.

2. In an electric heater, the combination of an elongated heating element which is adapted to glow when energized, a concave reflector for reflecting the heat generated by said element, a second elongated heating element which is adapted to glow when energized, a concave reflector which extends above said first mentioned reflector for reflecting the heat generated by said second heating element, whereby upon energization of the two said heating elements the images thereof in said reflectors merge and provide a composite image which is larger than the image produced in said first mentioned reflector, said reflectors being spaced apart to provide a passage between them and means for driving air through said passage so that it is heated by said second element, the reflector of said second heating element being adapted to direct the current of heated air outwardly to supplement the heat reflected by said reflectors.

3. In an electric heater having side walls, the combination of an elongated heating element which extends lengthwise between said walls and which is adapted to glow when energized, an imperforate reflector for reflecting heat generated by said heating element, a second elongated heating element which extends lengthwise between said walls and which is adapted to glow when energized, a reflector for said second heating element which extends above said first mentioned heating element, whereby upon energization of the two said elements, the images thereof merge to provide a composite image which is larger than the image produced by said first mentioned heating element, said reflectors being spaced to provide a passage between them and a fan for driving air through said passage past said second heating element, the reflector for said second heating element serving to direct the heated air outwardly to supplement the heat reflected by said reflector.

4. In an electric heater having side walls, the combination of an elongated heating element extending lengthwise between said walls and being adapted to glow when energized, a concave reflector for reflecting heat generated by said heating element, a second elongated heating element extending between said walls and substantially parallel to said first mentioned heating element but above the same, said second heating element being adapted to glow when energized, a concave reflector for said second heating element spaced from said first mentioned reflector to provide a passage between the reflectors and a fan for driving air through said passage to be heated by said second heating element, the reflector for said second heating element extending above said first mentioned reflector, whereby upon energization of the two heating elements the images thereof merge to provide a composite image which is larger than the image produced by said first mentioned heating element, the reflector for said second heating element serving to direct the heated air outwardly from the heater to supplement the heat reflected by the said reflectors.

CHARLES W. LOGAN.